US012254702B2

(12) United States Patent
Sidhu et al.

(10) Patent No.: US 12,254,702 B2
(45) Date of Patent: Mar. 18, 2025

(54) SURROUND VIEW VEHICLE EGRESS ASSISTANCE

(71) Applicant: GM GLOBAL TECHNOLOGY OPERATIONS LLC, Detroit, MI (US)

(72) Inventors: Gurmeet S. Sidhu, Mississauga (CA); Akram M. Abdel-Rahman, Ajax (CA); Mansoor Alghooneh, Richmond Hill (CA); Russell A Patenaude, Macomb Township, MI (US); Patrick G. G. DiGioacchino, Niagara Falls (CA)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 18/096,134

(22) Filed: Jan. 12, 2023

(65) Prior Publication Data

US 2024/0242507 A1 Jul. 18, 2024

(51) Int. Cl.
*G06V 20/58* (2022.01)
*B60R 1/22* (2022.01)
*G06T 7/70* (2017.01)

(52) U.S. Cl.
CPC .............. *G06V 20/58* (2022.01); *B60R 1/22* (2022.01); *G06T 7/70* (2017.01); *B60R 2300/8093* (2013.01); *G06T 2207/30261* (2013.01)

(58) Field of Classification Search
CPC .. G06V 20/58; B60R 1/22; B60R 2300/8093; B60R 21/013; B60R 16/0232; G06T 7/70; G06T 2207/30261
See application file for complete search history.

(56) References Cited

U.S. PATENT DOCUMENTS

| | | | |
|---|---|---|---|
| 2008/0294314 A1* | 11/2008 | Morris | E05F 5/00 701/49 |
| 2017/0267233 A1* | 9/2017 | Minster | B60W 30/06 |
| 2017/0329002 A1* | 11/2017 | Koerber | H01Q 21/061 |
| 2018/0094969 A1* | 4/2018 | Kim | G01N 29/4436 |
| 2019/0100950 A1* | 4/2019 | Aravkin | G08G 1/166 |
| 2021/0071463 A1* | 3/2021 | Uebel | E05F 15/77 |
| 2021/0178966 A1* | 6/2021 | Burtch | B60J 5/0493 |

* cited by examiner

*Primary Examiner* — Farzana Hossain
(74) *Attorney, Agent, or Firm* — Quinn IP Law

(57) ABSTRACT

A system and method for surround view egress assistance that includes detecting, by a sensor in a vehicle, an obstacle in a swing path of a vehicle door. The method includes predicting, based on a geometrical analysis, one or more potential collision zones between the obstacle and the vehicle door. The predicting also includes determining a bank angle of the vehicle in the predicting of one or more potential collision zones. The method further includes estimating, based on data from an inertial measurement unit, a severity of an impact of the vehicle door with the obstacle. The method also includes detecting a color and height of a curb and potential collisions with a vehicle door.

17 Claims, 10 Drawing Sheets

SURROUND VIEW VEHICLE EGRESS ASSISTANCE

INTRODUCTION

Vehicles are a staple of everyday life. Special use cameras, microcontrollers, laser technologies, and sensors may be used in many different applications in a vehicle. Cameras, microcontrollers and sensors may be utilized in enhancing automated structures that offer state-of-the-art experience and services to the customers, for example in tasks such as body control, camera vision, information display, security, autonomous controls, etc. Further, functions utilizing proximity assistance may be used in situations where a vehicle or its occupants may need assistance in parking, entering, and exiting a vehicle.

The parking of a vehicle may present a number of challenges. A driver may pull a vehicle too close to a wall, or a neighboring vehicle to fully open the door without impacting an obstacle, e.g., the wall or another vehicle. Further, if a driver attempts to park a vehicle on a road with curbs, it is possible that opening a vehicle door may hit the curb when an occupant attempts to leave the vehicle, especially if the vehicle is on a hill that further tilts the vehicle. Cities may also regulate parking on the streets only allowing parking at certain times. And parking in certain zones may also be prohibited, e.g., close to a fire hydrant. Accordingly, it is desirable to provide entrance and egress assistance for vehicle occupants regarding possible obstacles around a vehicle.

SUMMARY

Disclosed herein are a system and methods for surround view egress assistance based on sensor data. As disclosed herein, a system for surround view egress assistance may include a vehicle with a sensor and a controller, e.g., a microcontroller, processor, or any type of computational device, that may process data from one or more sensors. The system may also include an inertial measurement unit integrated into the vehicle structure, or a vehicle telemetry unit, to collect and process vehicular data. Further, the sensor may be able to detect an obstacle and the controller, based on input from the sensor, predict, based on a geometrical analysis, a swing path of a vehicle door to determine one or more potential collision zones between the obstacle and the vehicle door. In addition, based on data from the inertial measurement unit, or from a vehicle telemetry unit that includes a velocity of the vehicle door, a weight of the vehicle door, and a position of the vehicle door, an estimate of a severity of an impact of the vehicle door with the obstacle.

Another aspect of the disclosure may be a system where the controller may be used to determine a bank angle of the vehicle and wherein, based on at least the bank angle, further predict the one or more potential collision zones.

Another aspect of the disclosure may be a system where the sensor may detect a color and height of an adjacent curb.

Another aspect of the disclosure may be a system where the sensor may detect an object strike between the vehicle door and the obstacle.

Another aspect of the disclosure may be a system where, based on data from the inertial measurement unit, estimate a vehicle door impact severity.

Another aspect of the disclosure may be a system where the obstacle is an outside rear view mirror of a neighboring vehicle.

Another aspect of the disclosure may be a system where the sensor and controller are used to detect and determine a location of the outside rear view mirror.

Another aspect of the disclosure may be a system where the sensor includes a camera on a side portion of the vehicle.

Another aspect of the disclosure may be a system that includes a communication device that may be used to access a cloud storage system to store information such as an occurrence of a door collision, a parking restriction, and a curb compatibility. Receipt of the information may also trigger a notification of an owner of the presence of that information. Further, the information may be shared with other vehicles, including vehicles not equipped with sensors and processors to detect such information.

Another aspect of the disclosure may include a method for surround view egress assistance. The method may include detecting, by a sensor in a vehicle, an obstacle in a swing path of a vehicle door. The method may further include predicting, based on a geometrical analysis, one or more potential collision zones between the obstacle and the vehicle door. The method may continue by estimating, based on data from an inertial measurement unit or from a vehicle telemetry unit that includes a velocity of the vehicle door, a weight of the vehicle door, a position of the vehicle door, and a severity of an impact of the vehicle door with the obstacle.

Another aspect of the method may include determining a bank angle of the vehicle and based on at least the bank angle, further predicting the one or more potential collision zones.

Another aspect of the method may include detecting a color and height of an adjacent curb.

Another aspect of the method may include detecting an object strike between the vehicle door and the obstacle.

Another aspect of the method may include estimating, based on data from the inertial measurement unit or from a vehicle telemetry unit that includes a velocity of the vehicle door, a weight of the vehicle door, a vehicle door impact severity.

Another aspect of the method may include that the obstacle is an outside rear view mirror of a neighboring vehicle.

Another aspect of the method may include determining a location of the outside rear view mirror.

Another aspect of the method may include that the sensor comprises a camera on a side portion of the vehicle.

Another aspect of the method may include accessing, using a communication device, a cloud storage system to store information including a door collision, a parking restriction, and a curb compatibility. Receipt of the information may also trigger a notification of an owner of the presence of that information. Further, the information may be shared with other vehicles, including vehicles not equipped with sensors and processors to detect such information.

Another aspect of the method may include determining a vehicle door position based on a camera image motion.

Another aspect of the disclosure may include a method for generating surround view egress status that may include generating, based on a geometrical analysis of a potential collision between an obstacle and a vehicle door, a surround view overlay. The method may also include generating, based on the geometrical analysis of the potential collision between the obstacle and the vehicle door, a map view overlay. The method may also include displaying, based on the surround view overlay, the potential collision, and a plurality of vehicle door detent positions, and by also displaying, based on the map view overlay, one or more curb compatible streets.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
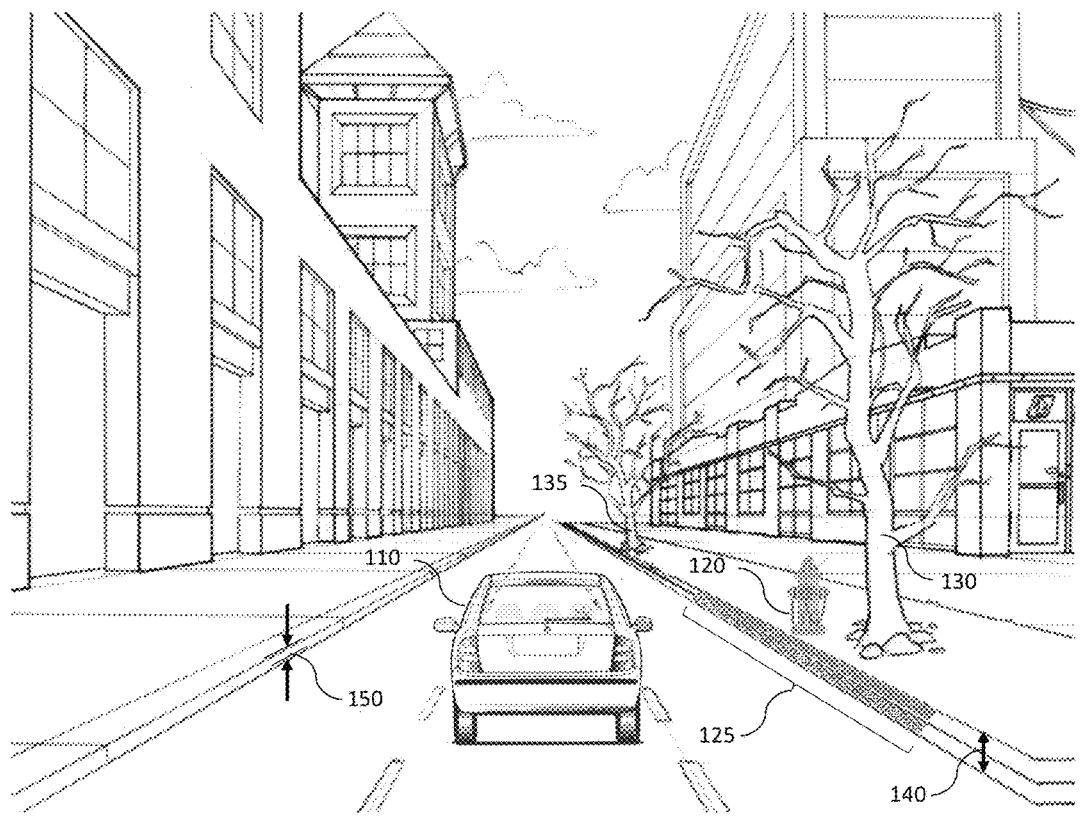
FIG. 1 is an illustration of an urban environment that illustrates a number of urban obstacles, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
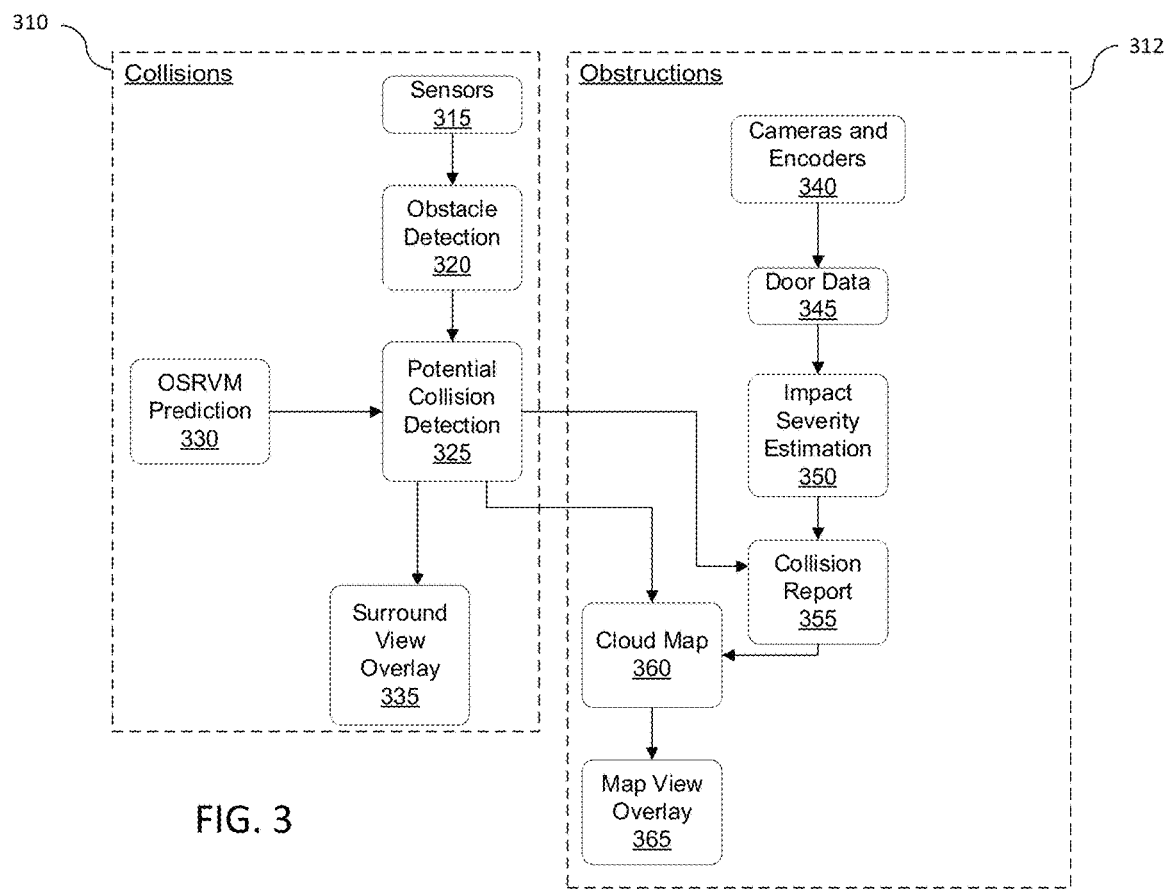
FIG. 3 is a flowchart of a method for detecting obstructions and potential collision detection, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110$a$" and "110$b$" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information of the vehicle, including, for example, location, automatic assistance sensors, occupancy data, motion sensors, to name a few. These systems may also provide detailed data as to the operation and location of a vehicle. Such information may be combined with remote databases, for example at cloud-based operation, to share data with other vehicles to augment map overlays from third party providers.

FIG. 1 is an illustration of an urban environment 100, according to an embodiment of the present disclosure. Urban environment 100 may include a vehicle 110 with a multitude of obstacles. Obstacles may include a fire hydrant 120, a restricted parking zone 125 in front of the fire hydrant 120, a first tree 130 and a second tree 135, a curb 140 of a first height, and a curb 150 of a second height.

An occupant in vehicle 110 may wish to park and depart, or egress, or pick up a person from vehicle 110. However, if vehicle 110 stops, or parks, and if a vehicle door is attempted to open near an obstacle, such as fire hydrant 120, first tree 130, or second tree 135, there may be a possibility of an impact between the vehicle door and the obstacle. Further, if vehicle 110 attempts to park in a restricted parking zone 125, possibly without realizing, then the vehicle 110 may be subject to a ticket or fine.

In another embodiment, if vehicle 110 stops in front of curb 140 of a first height, where the first height may be high enough that if a vehicle door of vehicle 110 may be opened then it may scrape and cause an impact between the vehicle door and curb 140. Whereas if vehicle 110 stops in front of curb 150 of a second height, where the second height may be less than the first height, if a vehicle door of vehicle 110 may be opened then it may have enough clearance such that there is no impact between the vehicle door and curb 150.

Figure 2A:
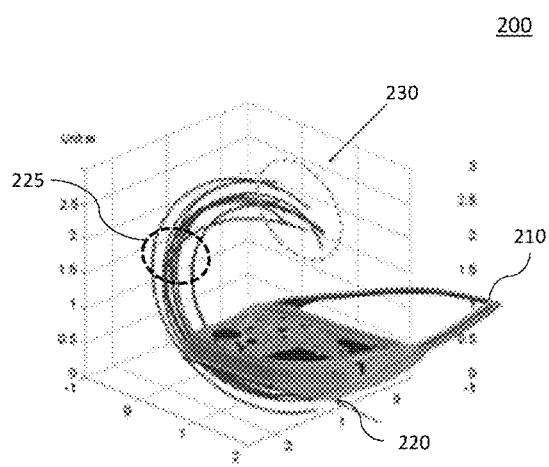
FIGS. 2A and 2B illustrate a vehicle door and a possible geometric calculation of a door swing, in accordance with the disclosure.

FIG. 2A is an illustration of a vehicle door and its associated swing path 200, according to an embodiment of the present disclosure. Vehicle door 210 is depicted on a displacement chart illustrating its swing path. For example, vehicle door 210 may include a set of door locations 220 of the vehicle door 210, which given that the physical configuration of the vehicle door 210 may be determined and its one or more pivot points may also be determined, by the use of geometric analysis a set of swing paths 225 representing the location of the door locations 220 may be calculated as the vehicle door 210 is swung open. Area 230 may represent the position of door locations 220 when the vehicle door 210 is opened to its fullest. Thus, as will be discussed, if an obstacle is present in the area of swing paths 225, then a possible collision zone may be predicted for each of the door locations 220.

Figure 2B:
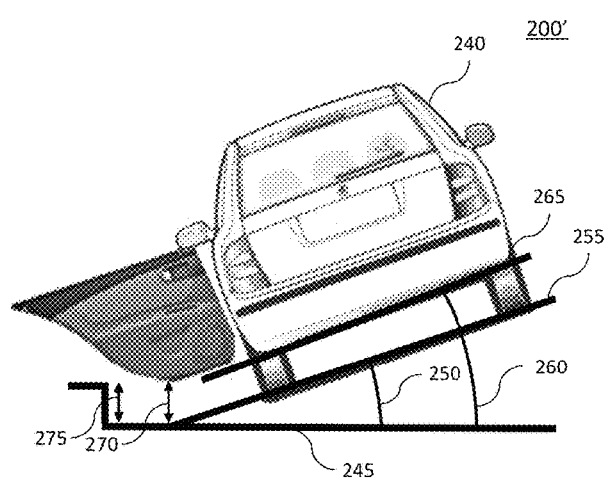

FIG. 2B illustrates examples of factors 200' associated with possible geometric calculations of swing paths, according to an embodiment of the present disclosure. Factors 200' may include vehicle 240 and its associated physical characteristics. For example, depending on the model of vehicle 240, vehicle 240 may have different weights, dimensions, number of doors, etc., of which may impact the dynamics associated with its doors. Further factors that may influence the swing paths of a vehicle door of vehicle 240 may include a bank angle 250 that may represent the angle of inclination between a horizontal plane 245 and road plane 255. Also, given the suspension, weight, and physical characteristics of vehicle 240, roll angle 260 may represent the angle of inclination between the horizontal plane 245 and vehicle plane 265, where roll angle 260 may be greater than bank angle 250.

Given the bank angle 250 and roll angle 260 in conjunction with the physical characteristics of vehicle 240, including a lower door length, a clearance distance 270 may be calculated and compared to a curb height 275 to determine the possibility of a potential collision between a door of vehicle 240 and a curb height 275.

FIG. 3 is a flowchart of a method 300 for detecting obstruction and potential collision detection between a vehicle door and an obstacle, according to an embodiment of the present disclosure. Method 300 may be depicted as a collisions detection portion 310 and an obstructions portion 312. Collisions detection portion 310 may include sensors 315 and controllers (not shown but may be used to process output from the sensors 315 that may also be contained within other modules referenced in FIG. 3), obstacle detection 320, potential collision detection 325, outside rearview mirror (OSRVM) prediction 330 and surround view overlay 335. Sensors 315 may include a variety of sensor types including laser, ultrasonic, and cameras. Data from sensors 315 may be passed to obstacle detection 320 that may be used to analyze motion from the sensors of a vehicle door and based upon the vehicle's physical characteristics and characteristics of the obstacle may determine that an obstacle may be in the swing path of one or more of the vehicle's doors.

Potential collision detection 325 may determine, based on input data, a potential of a collision. Potential collision detection 325 may perform a geometric analysis as discussed in FIGS. 2A and 2B, based on data associated with a vehicle's orientation and dimension, including data from a neighboring vehicle, including a prediction of a swing path of its OSRVM, to determine a potential collision. Data from potential collision detection 325 may be forwarded to a surround view overlay 335 that may warn of potential collisions and may also display such warnings in conjunction with the location of a vehicle door at its one or more detent angles.

Data from potential collision detection 325 may also be passed to the cloud map 360 and collision report 355 of the obstructions portion 312.

Obstructions portion 312 may include cameras and encoders 340, in addition to sensors 315. Cameras and encoders 340 may include side cameras and sensors that may detect side door and back door, e.g., hatch or sportback, positions and motion. Door data 345 may include positions and motion for the doors of a vehicle including door positions through the use of door encoders and through the use of image analysis. Image analysis may include the use of tracking pixel position to determine position and velocity from the cameras and encoders 340.

Impact severity estimation 350 may, based on door data 345 and other characteristics, for example the weight and velocity of a particular door, estimate a severity of an impact between a vehicle door and an obstacle.

Collision report 355, based on received information from potential collision detection 325 and impact severity estimation 350 may provide collision, or near miss type information to fleet operations and insurance companies. Such information may also be sent to cloud map 360, which may combine with additional information from potential collision detection 325 to generate a database of map curb compatible streets and map parking restrictions and information. Such information may then be sent to map view overly 365 for display to vehicle occupants.

Figure 4:
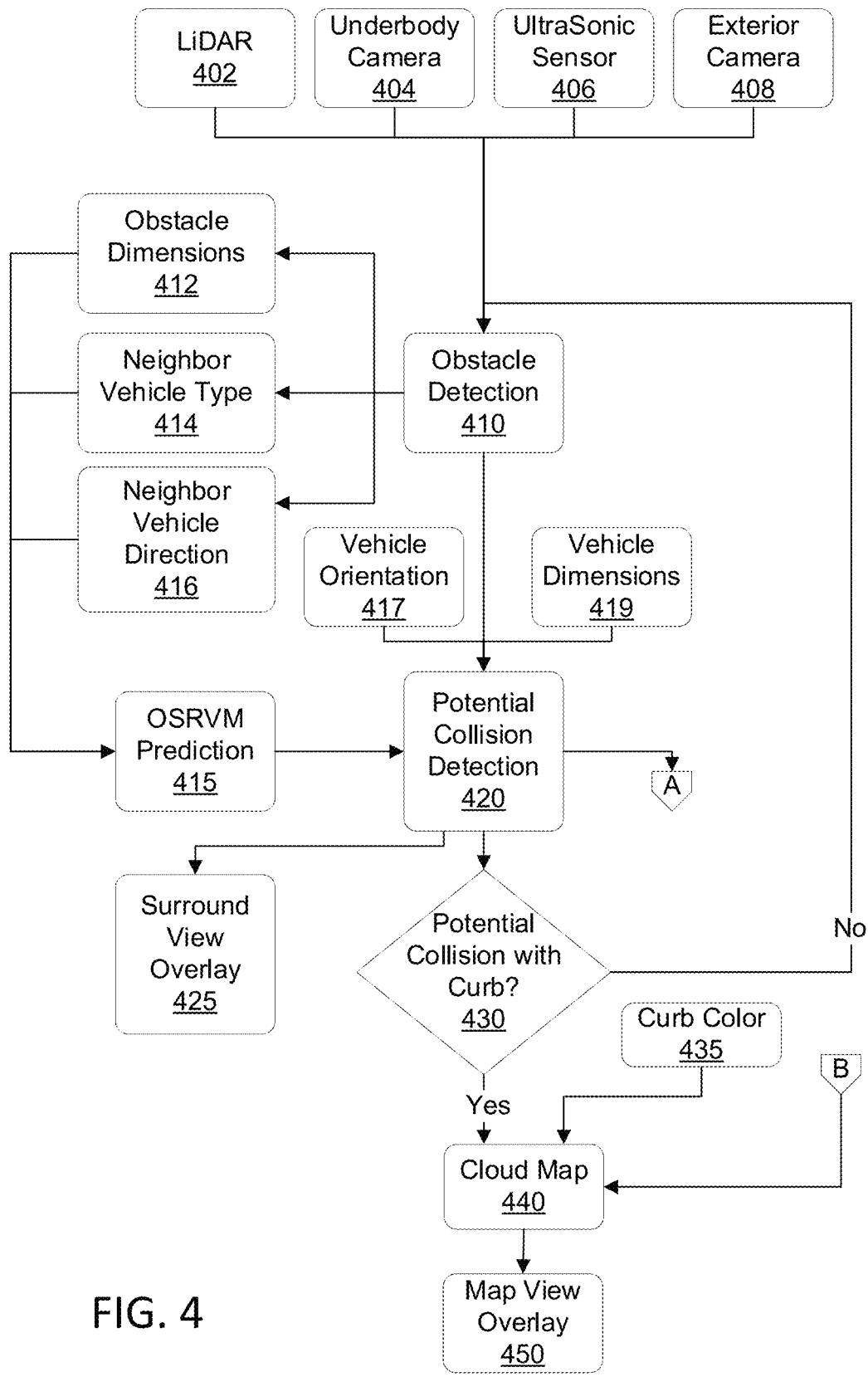
FIG. 4 depicts a detail flowchart of a method for determining potential collision detection, in accordance with the disclosure.

FIG. 4 is a detailed flowchart of a method 400 for determining potential collision detection between a vehicle door and an obstacle, according to an embodiment of the present disclosure. Method 400 includes sensors, for example as discussed with sensors 315, method 400 may include multiple sensors, for example LiDAR 402, an underbody camera 404, an ultrasonic sensor 406 and an exterior camera 408 that may be located within a vehicle, such as vehicle 110. The vehicle may have one or more of these type of sensors, or other types not specifically listed, as sensors 402, 404, 406, and 408 are illustrative and not meant to be limiting. Data from the sensors is sent to obstacle detection 410, which as discussed in FIG. 3, may also include processors, microcontrollers, or other dedicated circuitry to process output from the sensors. Obstacle detection 410 may detect obstacles such as curbs, trees, fire hydrants, or other objects. In addition, obstacle detection 410 may also detect other vehicles, for example if vehicle 110 pulls into a parking lot, obstacle detection unit may identify neighboring vehicles that may be parked on either side of vehicle 110, in front of vehicle 110, or behind vehicle 110.

Obstacle detection 410 may then generate sets of data that may later be used as an input to potential collision detection. Such data may include obstacle dimensions 412, for example the height and width and depth of an obstacle. The data may also include neighbor vehicle type 414, for example, the neighbor vehicle is an SUV, truck, sedan, or motorcycle. In addition, the data may include a neighbor vehicle direction 416, for example is the neighboring vehicle facing vehicle 110, alongside of vehicle 110, or pointing away from vehicle 110.

Data from obstacle dimensions 412, neighbor vehicle type 414, and neighbor vehicle direction 416 may then be sent to OSRVM prediction 415. OSRVM prediction 415, based on its input data, may perform an analysis to predict the likelihood of an OSRVM of the neighboring vehicle, which typically is the obstacle that projects the furthest from a vehicle, may impact the vehicle 110.

Potential collision detection 420 may receive data regarding a neighboring vehicle from OSRVM prediction 415 combined with data from obstacle detection 410 and compare such data with data regarding vehicle 110, such as vehicle orientation 417 and vehicle dimensions 419. Then, utilizing a set of mathematical calculations, potential collision detection 420 may perform a geometric analysis between an obstacle, e.g., the neighboring vehicle and vehicle 110.

Potential collision detection 420 may pass its analysis to surround view overlay 425 in which surround view overlay 425 may warn the occupants of vehicle 110 of potential collisions and display such information as will be discussed in further detail in FIGS. 5A, 5B, and FIG. 6. In addition, potential collision detection 420 may pass its analysis to a collision report step 870 as will be discussed in FIG. 8. Potential collision detection 420 may also determine if the obstacle is a curb, at potential collision with curb 430, if there is a potential collision. If a collision is predicted to not occur the flowchart is directed back to obstacle detection 410 to continue monitoring. If, however, a collision with a curb is predicted, then such a prediction is passed to cloud map 440. Cloud map 440, with input from the sensors at curb color 435, determines whether the curb area may be a restricted parking or stopping zone.

Cloud map 440 may also receive input from the collision with a curb in step 880 that indicates a collision between a curb and a vehicle, for example vehicle 110, has occurred. Cloud map may then compile a map curb with compatible streets for various type of vehicles in addition to parking restrictions and information gathered by the sensors. Map view overlay 450 may then process information from cloud map 440 to display curb compatible streets and also display parking restrictions and restrictions as will be discussed in FIG. 7. Map view overlay 450 may also display, to vehicle occupants, graphics illustrating the status/position of doors in relation to detected obstacles.

Figures 5A, 5B, 5C:
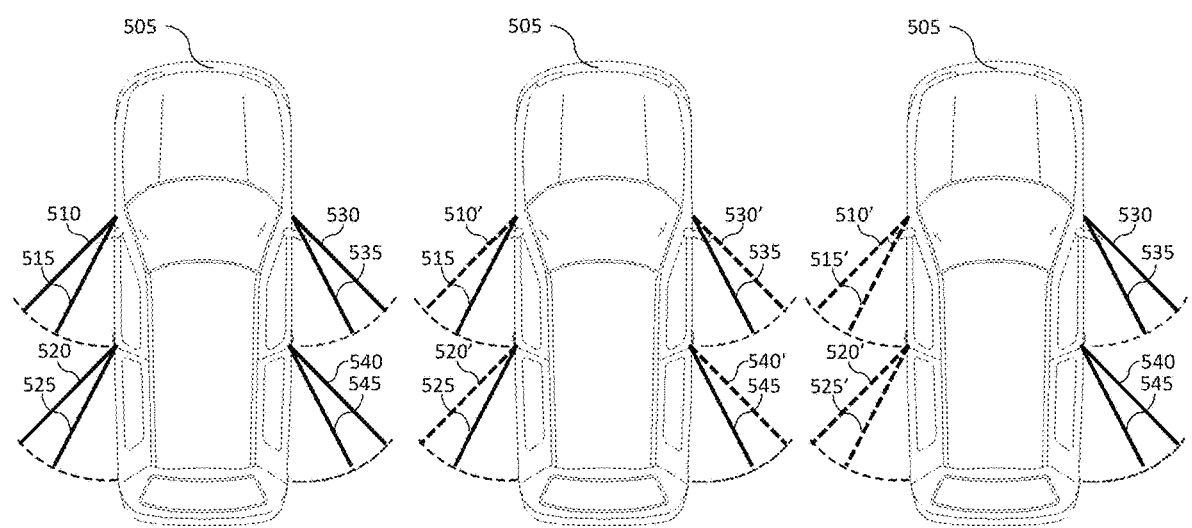
FIGS. 5A, 5B, and 5C depict a display of scenarios of vehicle door detents and possible collision zones, in accordance with the disclosure.

FIGS. 5A, 5B, and 5C illustrate scenarios of possible displays of vehicle door position detents and possible collision zones, according to an embodiment of the present disclosure. As discussed, map view overlay 450 may display graphics illustrating the status/position of doors in relation to detected obstacles.

FIG. 5A illustrates indent door positions of vehicle 505 at first detent positions 515, 525, 535, and 545 and second indent door positions at 510, 520, 530, and 540, where the second indent door positions illustrate the furthest the doors may be capable of swinging. Further, the dashed lines indicate a possible collision warning. Therefore, in FIG. 5B illustrates a display warning to the occupants that there are possible collisions of the doors at the second detent positions, 510', 520', 530', and 540'. FIG. 5C illustrates a display warning to the occupants that there are possible collisions of the left-hand doors at both the first and second detent positions, 510', 515', 520', and 525' while the right-hand doors are clear to open fully.

Figure 6:
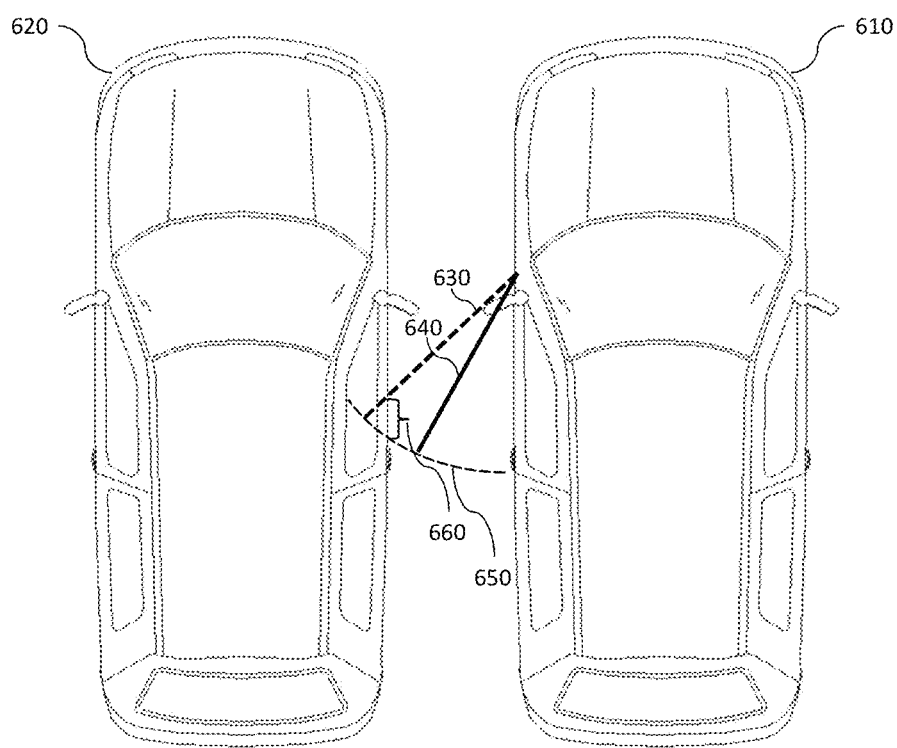
FIG. 6 depicts a display of a possible collision zone with a neighboring vehicle, in accordance with the disclosure.

FIG. 6 illustrates a possible display of a collision zone with a neighboring vehicle, according to an embodiment of the present disclosure. FIG. 6 illustrates vehicle 610 alongside neighboring vehicle 620. First indent position 640, shown as a solid line, may indicate that no collisions are being predicted if the door is swung out to the first ident position. However, the second indent position 630 indicated, by the dashed line, predicts a possible collision between the vehicle door and neighboring vehicle 620. Swing path 650 illustrates the arc path of the outer edge of the vehicle door with a collision zone 660 showing a possible impact zone of the vehicle door with neighboring vehicle 620.

Figure 7:
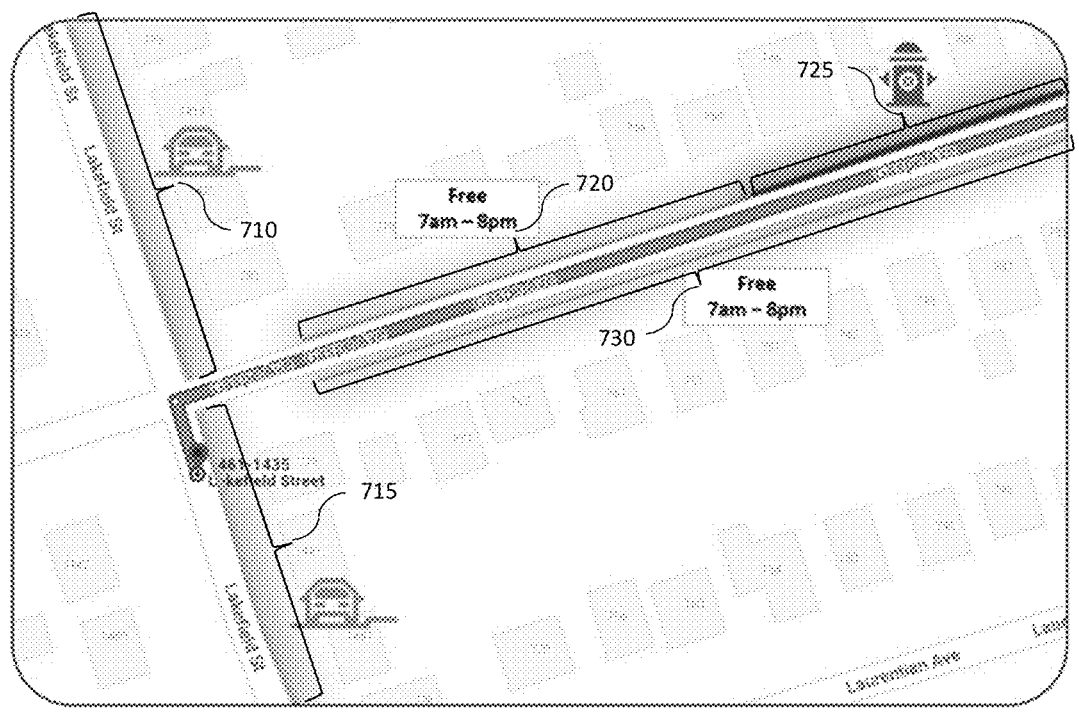
FIG. 7 depicts an urban environment with a variety of parking obstacles, in accordance with the disclosure.

FIG. 7 illustrates an urban environment with a variety of parking obstacles, according to an embodiment of the present disclosure. FIG. 7 relates to the flow chart in FIG. 4, specifically to potential collision detection 420, potential collision with curb 430, curb color 435, cloud map 440, and map view overlay 450.

FIG. 7 highlights various parking scenarios, for example area 710 and area 715 shows that there are no parking restrictions and may also display these areas with a certain color. Area 720 and area 730 illustrate that parking is available, but with a restricted time frame, e.g., 7 am-8 pm. And area 725 may illustrate a restricted parking zone, here being a fire hydrant. Further, as discussed in FIG. 4, curb color 435, using a sensor, may determine a restricted parking zone by the color of a curb. For example, area 725 may include a curb color of red thereby indicating a no parking zone. In addition, FIG. 7 illustrates the use of icons in a display to convey a parking status, for example, the fire hydrant, the parking zone times, and a vehicle icon. In addition, as discussed in FIG. 1 and FIG. 2, curb compatibility, or curb height as compared to a swing path of a door may also be indicated.

Figure 8:
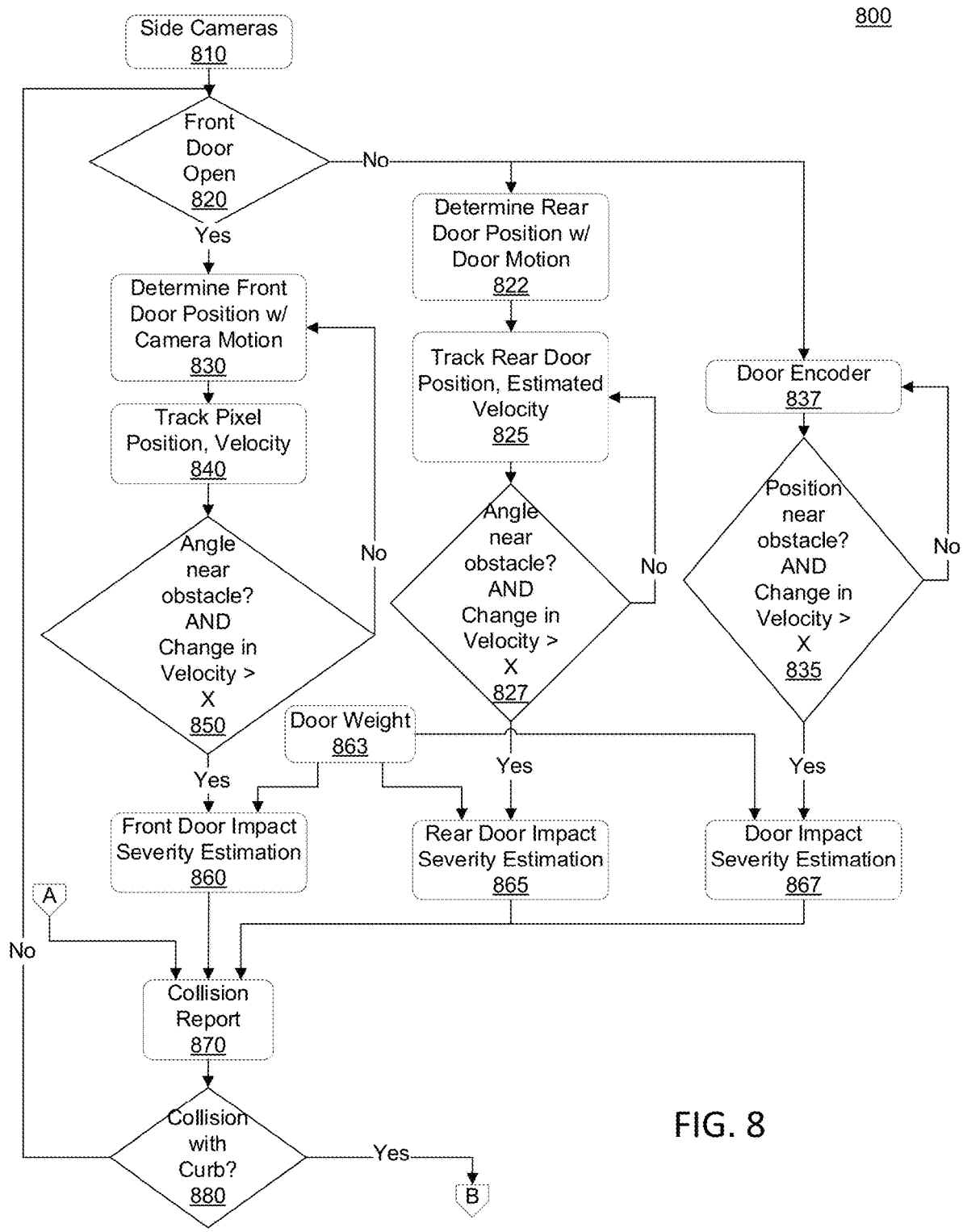
FIG. 8 depicts a detail flowchart of a method for estimating door impact severity, in accordance with the disclosure.

FIG. 8 illustrates a detail flowchart of a method 800 for estimating door impact severity, according to an embodiment of the present disclosure. FIG. 8 may be directed to a front door of a vehicle but may also be directed to another door of the vehicle using the same or similar approach. Method 800 may utilize side cameras that may be integrated into an OSRVM or otherwise located on an outside of a vehicle, for example vehicle 110. At step 810 the side cameras may be activated. At step 820, the side cameras may detect that the front door has been opened. At step 830 the side cameras of step 810 may detect motion in the front door due to motion being detected in one or more of the cameras. Further, in step 840 by tracking pixels in an image captured by the one or more cameras a velocity of the door may be computed. At step 850 the sensors, such as the LiDAR 402, the underbody camera 404, the ultrasonic sensor 406 or the exterior camera 408, or even the side cameras, may have detected an obstacle. And, since, at step 830 and step 840, the position and velocity of the door may be calculated, an angle of the door opening may also be calculated and compared to a threshold. At which point, if the position and velocity, or change in velocity, of the door are determined to be greater that a threshold value then it may be determined that there will be an impact between the front door and the obstacle. At step 860 given that an impact likelihood has been established and given that a weight of the door at step 863 may be determined, an estimation of the severity of the front door with the obstacle may be estimated.

If at step 850 the position and velocity, or change in velocity, may be less than the threshold, then method 800 is returned to step 830 to continue to determine a position of the front door.

If, at step 820, it is determined that the front door has not been opened at step 822, a determination may be made that a rear door may have been opened and motion may be detected. At step 825 the rear door position and velocity may be estimated where such estimation may be accomplished through the use of rear cameras or other types of position encoders. At step 827 the position and velocity, or change in velocity, may be calculated and a determination may be made that the rear door may be near a detected obstacle. If the position and velocity, or change in velocity, exceed a certain threshold then step 827 may determine that there may be an impact between the rear door and the obstacle. At step 865, given that a weight of the rear door may be determined from step 863, an estimation of a severity of the rear door impact with the obstacle may be made at step 865.

At step 820 if a determination is made that the front door, either on the driver or passenger side, has not been opened, but at step 837 through the use of a door encoder may sense that another door has been opened. At step 835 the position and velocity, or change in velocity, may be calculated and a determination may be made that the rear door may be near a detected obstacle. If the position and velocity, or change in velocity, exceed a certain threshold then step 835 made determine that there may be an impact between the door and the obstacle. At step 867, given that a weight of the rear door may be determined from step 863, an estimation of a severity of the rear door impact with the obstacle may be made at step 867.

At step 870 a collision report may be generated based on an impact of the front doors, back doors, or other doors and from the potential collision detection 420 from FIG. 4. Further, at step 880, if the obstacle was a curb, then the method may continue to the cloud map 440 discussed in FIG. 4. If at step 880, the obstacle was not a curb, the method may continue to step 820 such that ongoing monitoring with the side cameras may continue.

Figure 9:
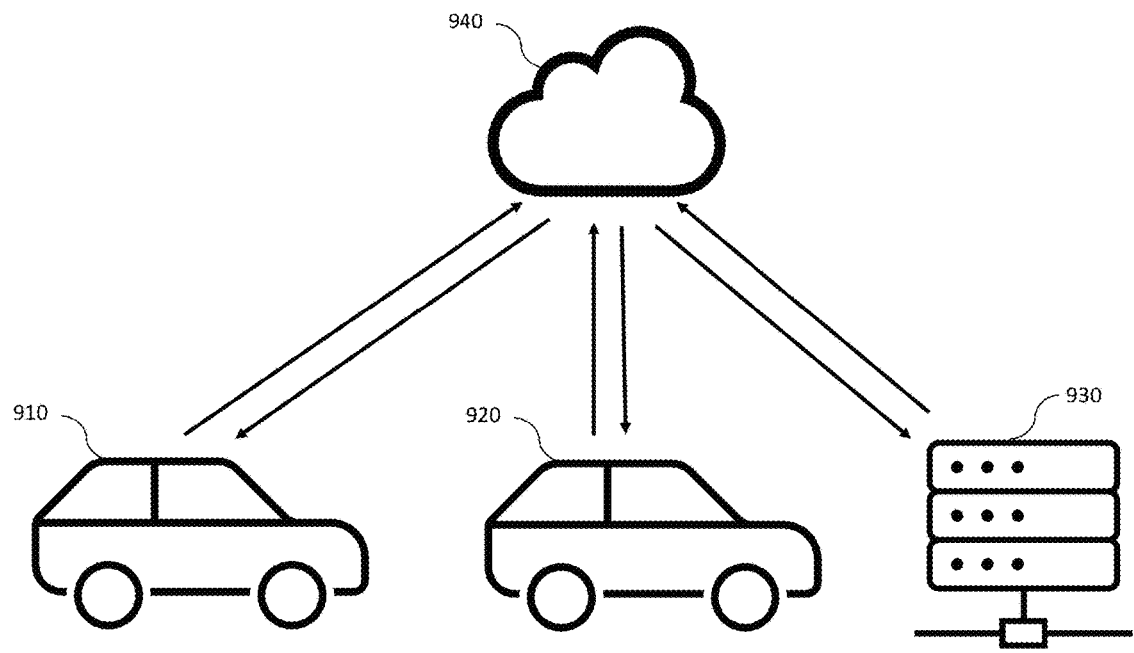
FIG. 9 depicts a vehicle to cloud and a cloud to vehicle and server transfer of information using a vehicle communication device, in accordance with the disclosure.

FIG. 9 illustrates a vehicle to cloud communication environment 900, according to an embodiment of the present disclosure. Environment 900 may include multiple vehicles, for example vehicle 910 and vehicle 920. Vehicle 910 may communicate, using a vehicular communication device, not shown, through cloud 940 to vehicle 920. Vehicle 910 may include sensors and processors, or microcontrollers, as discussed in FIG. 3 that may be configured to detect obstacles and predict potential collisions. Thus, vehicle 910 may transfer such information to a vehicle 920 that may not be equipped to sense and predict such potential collisions. Such peer-to-peer vehicular communications may enable vehicle 910 to share pertinent information with other vehicles of a similar body style and clearances.

Vehicle 910 may also communicate through cloud 940 to server 930, such as a back-office system. For example, server 930 may belong to a fleet owner in which vehicle 910 and vehicle 920 may be owned by the fleet owner. Vehicle 910 and vehicle 920 may then be programmed to upload information through cloud 940 that may be of interest to the fleet owner. For example, if vehicle 910 senses an obstacle and predicts a potential collision then such information, possibly including the location of vehicle 910 may be communicated through cloud 940 to server 930 of the fleet owner. Further, if vehicle 910 detects a collision, for example from another vehicle or from a collision with a curb, that information may also be conveyed to the fleet owner.

A fleet owner, through server 930 may also communicate back to vehicle 910 and vehicle 920 through cloud 940, for example with information collected from other vehicles and shared through a cloud map, such as cloud map 360 and a map view overlay, for example map view overlay 365.

Figure 10:
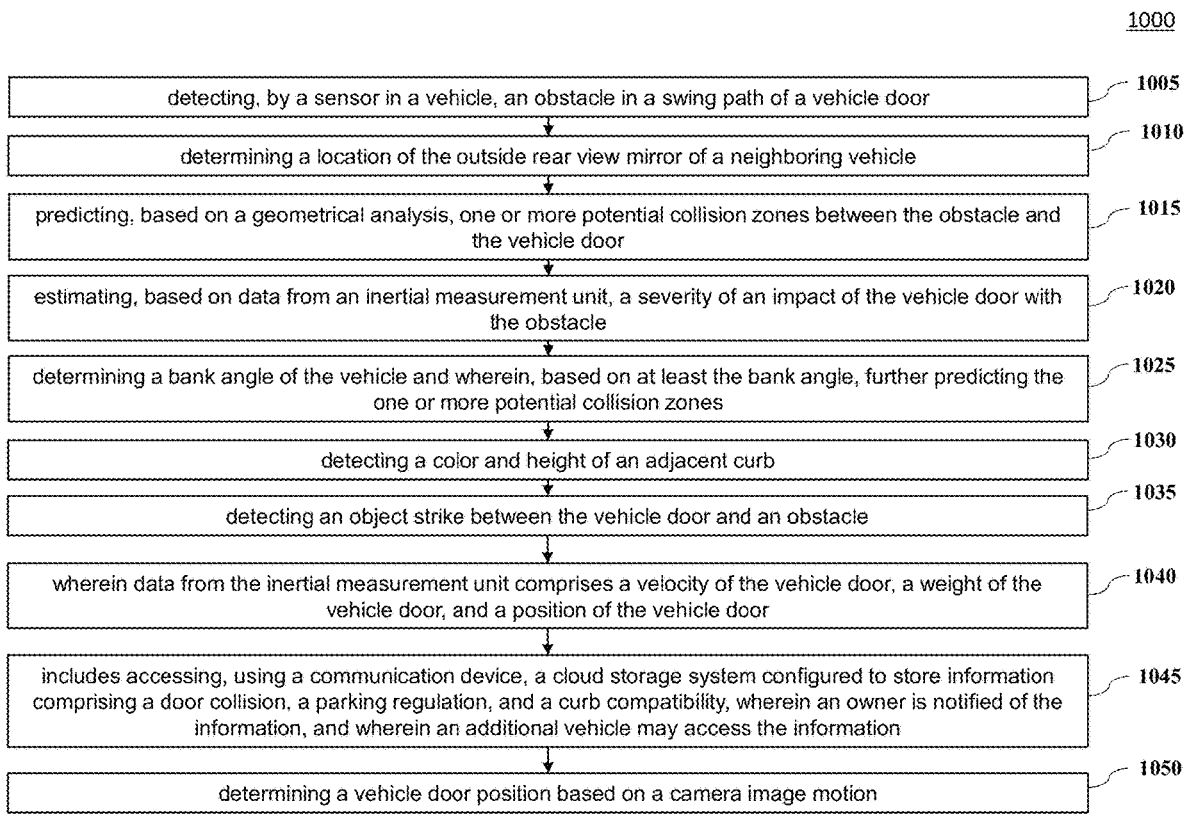
FIG. 10 depicts a detail flowchart of a method for surround view egress assistance, in accordance with the disclosure.

FIG. 10 shows an exemplary embodiment of a method 1000 for surround view egress assistance, according to an embodiment of the present disclosure. Method 1000 begins at step 1005 with a detecting, by a sensor in a vehicle, an obstacle in a swing path of a vehicle door. As discussed, an obstacle may be many different objects. In FIG. 1 obstacles includes may be a first tree 130 or a second tree 135. Obstacles may also be a curb of a street such as a curb 140 of a first height and a curb 150 of a second height, or even an object such as a fire hydrant 120. Obstacle may also be other vehicles, such as vehicle 620. Sensors in a vehicle may detect these obstacles. Sensors such as sensors 315, may include technologies such as a LiDAR 402, an underbody camera 404, an ultrasonic sensor 406, and an exterior camera 408, or even a side camera in step 810.

At step 1010 a location of the OSRVM of a neighboring vehicle may be determined. The OSVRM of a vehicle may be the portion of a vehicle that protrudes from the body of the vehicle more than other portions of the vehicle. As such, at step 1010 the location of an OSRVM of a neighboring vehicle may be determined and used to predict or estimate one or more collision zones between the OSRVM and the vehicle.

At step 1015 the method may include predicting, based on a geometrical analysis, one or more potential collision zones between the obstacle and the vehicle door. For example, as discussed in FIG. 2A, the physical characteristics of vehicle door 210 are known. Its weight, dimensions, shape, and pivot points may be determined for any particular model and make of a vehicle. Therefore, a swing path, for each point of the vehicle door 210 may be geometrically calculated. Once the swing paths, such as swing paths 225 may be determined, it may be possible to predict the likelihood of a collision between the vehicle door and an obstacle.

Further, a collision zone, such as collision zone 660, may be displayed to occupants in the vehicle. Also, depending on the shape of the vehicle door and the shape of the obstacle, the collision zone 660 may include multiple points on both the obstacle and the vehicle door.

At step 1020, once an obstacle may be detected and based on a geometrical analysis, a predicting of one or more potential collision zones may have occurred, then based on data from an inertial measurement unit, a severity of an impact of the vehicle door with the obstacle may be estimated. Further, in place of an inertial measurement unit, data may be received from a vehicle telemetry unit that may include a velocity of the vehicle door, a weight of the vehicle door, and a position of the vehicle door, and from which a severity of an impact may also be estimated.

At step 1025 the predicting of step 1015 may also take into account the position and tilt of the vehicle, for example as shown in FIG. 2B due to a bank and roll angle of the vehicle, e.g., bank angle 250 and roll angle 260. For example, if the bank angle 250 and roll angle 260 are great enough, it may be calculated that a vehicle door may impact a curb, where if the bank angle 250 and roll angle 260 were zero, e.g., no vehicle tilt, that the vehicle door may miss impacting the curb when opened.

At step 1030, sensors, such as the sensors discussed in step 1005, may detect a color and height of an adjacent curb. FIG. 7 illustrated some possible curb scenarios, for example area 725 may be designated as a restricted parking zone and painted red as an indication to motorists that the area 725 does not allow for parking. Or area 720 and area 730 may be designated as parking with restrictions such as during certain hours of the day. This availability information may be conveyed by a particular color of the curb or stored and accessed through the cloud, for example through the cloud map 440. Such information may then be conveyed to vehicle occupants through a visual or audible interface, for example through map view overlay 450.

At step 1035, an actual strike between the vehicle door and an obstacle may be detected. Such detection may utilize the sensors previously discussed or may also include motion or vibration sensors. The strike between the vehicle door and an obstacle may be caused by movement of the vehicle door or may also include a strike from a neighboring vehicle or object without movement of the vehicle door.

At step 1040, as discussed above, a severity of an impact of the vehicle door with the obstacle may be based on data from an inertial measurement unit, where that data may include a velocity of the vehicle door, a weight of the vehicle door, and a position of the vehicle door.

At step 1045 data that is captured or calculated in the vehicle may be passed up to a cloud storage system. In addition, data that is stored in the cloud storage system may be accessed and downloaded to the vehicle or to a different vehicle or a vehicle owner, for example a fleet owner. Thus, step 1045 includes accessing, using a communication device, a cloud storage system configured to store information comprising a door collision, a parking restriction, and a curb compatibility wherein an owner may be notified of the presence of information, and wherein an additional vehicle may also have access to the information. As discussed with collision report 355 such data may also be sent to cloud map 360, which may combine with additional information from potential collision detection 325 to generate a database of map curb compatible streets and map paring restrictions and information. Further, such information may also be sent to map view overly 365 for display to vehicle occupants.

At step 1050, a position of the door may be determined in a number of ways. One such method is to use an outside camera, for example a camera mounted in an OSRVM, to determine its position based on the camera image motion. For example, as discussed in FIG. 8, at step 830, the side cameras of step 810 may detect motion in the front door due to motion being detected in one or more of the cameras. Further, in step 840 by tracking pixels in an image captured by the one or more cameras a velocity of the door may be computed.

Method 1000 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for surround view egress assistance comprising:
   a vehicle comprising a sensor and a controller; and
   an inertial measurement unit integrated into the vehicle;
   wherein the sensor is configured to detect an obstacle; and
   the controller, based on input from the sensor, is configured to predict, based on a geometrical analysis of a vehicle door, a plurality of swing paths of the vehicle door to determine, based on the geometrical analysis of the vehicle door and the plurality of swing paths, one or more potential collision zones between the obstacle and the vehicle door, and wherein, based on data from the inertial measurement unit, the controller is further configured to estimate a severity of an impact of the vehicle door with the obstacle; and
   wherein the controller is further configured to determine a bank angle of inclination of the vehicle and based on at least the bank angle, further predict the one or more potential collision zones.

2. The system of claim 1, wherein the sensor is configured to detect a color and height of an adjacent curb.

3. The system of claim 1, wherein the sensor is further configured to detect an object strike between the vehicle door and the obstacle.

4. The system of claim 1, wherein the data from the inertial measurement unit comprises a velocity of the vehicle door, a weight of the vehicle door, and a position of the vehicle door.

5. The system of claim 1, wherein the obstacle is an outside rear view mirror of a neighboring vehicle.

6. The system of claim 5, where the sensor and controller are configured to detect and determine a location of the outside rear view mirror.

7. The system of claim 1, wherein the sensor comprises a camera on a side portion of the vehicle.

8. The system of claim 1, further comprising a communication device configured to access a cloud storage system configured to store information comprising a door collision, a parking restriction, and a curb compatibility, wherein an owner is notified of the information, and wherein an additional vehicle is granted access to the information.

9. A method for surround view egress assistance comprising:
   detecting, by a sensor in a vehicle, an obstacle in one or more of a plurality of swing paths of a vehicle door;
   predicting, by a controller, based on a geometrical analysis of the vehicle door and the plurality of swing paths, one or more potential collision zones between the obstacle and the vehicle door;
   estimating, by the controller, based on data from an inertial measurement unit, a severity of an impact of the vehicle door with the obstacle; and determining a bank angle of inclination of the vehicle and based on at least the bank angle of inclination, further predicting the one or more potential collision zones.

10. The method of claim 9, further comprising detecting a color and height of an adjacent curb.

11. The method of claim 9, further comprising detecting an object strike between the vehicle door and the obstacle.

12. The method of claim 9, wherein the data from the inertial measurement unit comprises a velocity of the vehicle door, a weight of the vehicle door, and a position of the vehicle door.

13. The method of claim 9, wherein the obstacle is an outside rear view mirror of a neighboring vehicle.

14. The method of claim 13, further comprising determining a location of the outside rear view mirror.

15. The method of claim 9, wherein the sensor comprises a camera on a side portion of the vehicle.

16. The method of claim 9, further comprising accessing, using a communication device, a cloud storage system configured to store information comprising a door collision, a parking restriction, and a curb compatibility, and notifying an owner of the information, and making available the information to another vehicle.

17. The method of claim 9, further comprising determining a vehicle door position based on a camera image motion.

* * * * *